(12) United States Patent
Barbati et al.

(10) Patent No.: US 11,241,836 B2
(45) Date of Patent: Feb. 8, 2022

(54) METHOD AND APPARATUS FOR DETERMINING EXTRUDATE FLOW IN THREE-DIMENSIONAL (3D) PRINTING

(71) Applicant: Desktop Metal, Inc., Burlington, MA (US)

(72) Inventors: Alexander C. Barbati, Cambridge, MA (US); Jonah Samuel Myerberg, Lexington, MA (US)

(73) Assignee: Desktop Metal, Inc., Burlington, MA (US)

( * ) Notice: Subject to any disclaimer, the term of this patent is extended or adjusted under 35 U.S.C. 154(b) by 616 days.

(21) Appl. No.: 15/949,499

(22) Filed: Apr. 10, 2018

(65) Prior Publication Data

US 2018/0297289 A1 Oct. 18, 2018

Related U.S. Application Data

(60) Provisional application No. 62/485,717, filed on Apr. 14, 2017.

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/106* (2017.08); *B29C 64/118* (2017.08);
(Continued)

(58) Field of Classification Search
CPC ..... B29C 64/393; B29C 64/118; B33Y 10/00; B33Y 30/00
See application file for complete search history.

(56) References Cited

U.S. PATENT DOCUMENTS

| 5,065,695 A | 11/1991 | Baron et al. |
| 6,054,077 A | 4/2000 | Comb et al. |

(Continued)

FOREIGN PATENT DOCUMENTS

| WO | WO 03/026872 A1 | 4/2003 |
| WO | WO 03/051598 A1 | 6/2003 |

(Continued)

OTHER PUBLICATIONS

Turner, B. N., et al., "A Review of Melt extrusion Additive Manufacturing Processes: I. Process Design and Modeling", Rapid Prototyping Journal, pp. 192-204 (2014).

(Continued)

*Primary Examiner* — Larry W Thrower
(74) *Attorney, Agent, or Firm* — Oak Law, PLLC; Jonathan D. Hall

(57) ABSTRACT

An additive manufacturing apparatus, and corresponding method, determine a mass (or volume) output flow rate of extrudate used in three-dimensional (3D) printing, and such determination is insensitive to rheological properties of a material of the extrudate being printed. A thermal energy balance on a liquefying extrusion head enables a load on a heater, used to heat the extrusion head, to be related to the output flow rate of extrudate. Based on the thermal energy balance, the output flow rate may be determined based on a duty cycle of the heater. The output flow rate may be employed to affect the 3D printing to prevent over- or under-extrusion of the extrudate and to identify a fault condition.

7 Claims, 5 Drawing Sheets

(51) Int. Cl.
*B29C 64/209* (2017.01)
*B33Y 50/02* (2015.01)
*B29C 64/295* (2017.01)
*B33Y 10/00* (2015.01)
*B33Y 30/00* (2015.01)
*B29C 64/227* (2017.01)
*B29C 64/343* (2017.01)
*B29C 64/106* (2017.01)

(52) U.S. Cl.
CPC .......... *B29C 64/209* (2017.08); *B29C 64/227* (2017.08); *B29C 64/295* (2017.08); *B29C 64/343* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,547,995 | B1 | 4/2003 | Comb |
| 2003/0064124 | A1 | 4/2003 | Comb |
| 2014/0265035 | A1 | 9/2014 | Buser et al. |
| 2015/0096717 | A1 | 4/2015 | Batchelder et al. |
| 2015/0097053 | A1 | 4/2015 | Batchelder et al. |
| 2015/0097308 | A1 | 4/2015 | Batchelder et al. |
| 2016/0200024 | A1 | 7/2016 | Kim et al. |
| 2018/0093420 | A1 | 4/2018 | Roberts et al. |
| 2018/0297288 | A1 | 10/2018 | Barbati et al. |

FOREIGN PATENT DOCUMENTS

| | | |
|---|---|---|
| WO | 2015/050958 A2 | 4/2015 |
| WO | WO 2016/049642 A1 | 3/2016 |

OTHER PUBLICATIONS

International Search Report and Written Opinion dated Jul. 11, 2018 for International Application No. PCT/US2018/026895, entitled "Method and Apparatus for Determining Extrudate Flow in Three-Dimensional (3D) Printing".

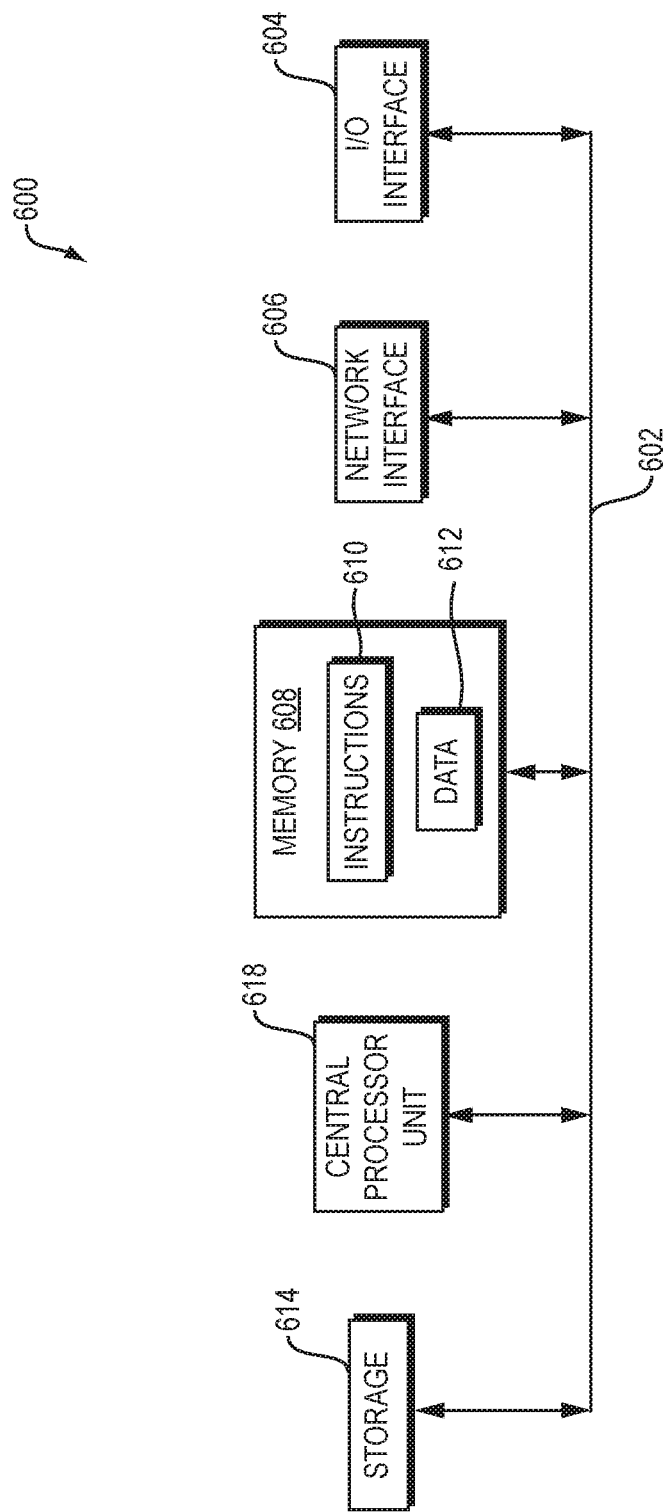

METHOD AND APPARATUS FOR DETERMINING EXTRUDATE FLOW IN THREE-DIMENSIONAL (3D) PRINTING

RELATED APPLICATION

This application claims the benefit of U.S. Provisional Application No. 62/485,717, filed on Apr. 14, 2017. The entire teachings of the above application are incorporated herein by reference.

BACKGROUND

Three-dimensional (3D) printing, also known as additive manufacturing (AM), may refer to processes used to create a 3D object in which successive layers of material are formed under computer control to create the 3D object. The 3D object may be of almost any shape or geometry and may be produced based on data from a computer aided design (CAD) model representing the 3D object, or any other suitable data.

An extrusion-based layered manufacturing machine may build up such a 3D object by extruding a build material, that may also be referred to interchangeably herein as a feedstock, filament, or media, from an extrusion head in a predetermined pattern onto a build surface, that may also be referred to interchangeably herein as a build plate, build platform, stage, base, or bed. The predetermined pattern may be determined based on the CAD model representing the 3D object, or any other suitable data.

The build material may be supplied to the extrusion head and the extrusion head may bring the build material to a flowable temperature to produce a flowable build material for deposition onto the build surface. A force of the incoming build material may cause extrusion of the flowable build material out from a nozzle of the extrusion head. The flowable build material may be extruded via the nozzle and adhere to a previously deposited build material with an adequate bond upon solidification.

A flow rate of the flowable build material being extruded from the nozzle may be a function of an advancement rate at which the build material is advanced to the extrusion head or pressure applied to advance the build material. The flow rate may be commanded by controlling the advancement rate via a controller that controls speed of a mechanism for advancing the build material or controls the pressure being applied to the build material. In addition to controlling the advancement rate, the controller may control movement of the extrusion head in a horizontal x, y plane, as well as movement of the build surface in a vertical z-direction. The controller may control the extrusion head movement relative to the 3D object being printed. For example, in some cases the 3D object being printed may move in x and y and the extrusion head may be stationary. By controlling such movements and the flow rate in synchrony, the flowable build material may be deposited onto the build surface layer-by-layer along tool paths that may be derived from the CAD model. The flowable build material being extruded may fuse to previously deposited build material and solidify to form the 3D object resembling the CAD model.

SUMMARY

According to an example embodiment, an apparatus for additive manufacturing of a three-dimensional (3D) object may comprise an extrusion head, a heater, and a controller. The extrusion head may be configured to transform a build material from a first state to a second state, the first state having a higher viscosity relative to the second state, and extrude the build material transformed to produce an extrudate used to print a 3D object in a 3D printing system. The heater may be configured to heat the extrusion head at a setpoint temperature to cause the transformation. The controller may be configured to (i) control a duty cycle of the heater, based on temperature of the extrusion head, to maintain the setpoint temperature, (ii) determine an output flow rate of the extrudate based on the duty cycle controlled, and (iii) employ the output flow rate determined to affect printing of the 3D object in the 3D printing system.

The apparatus may further comprise an actuator configured to advance the build material to the extrusion head based on a commanded input flow rate. The controller may be further configured to affect the printing by causing a change to the commanded input flow rate based on the output flow rate determined. The change enables over-extrusion or under-extrusion of the extrudate to be avoided.

The apparatus may further comprise a temperature sensor configured to measure the temperature of the extrusion head. The controller may be a closed-loop controller. The controller may be further configured to control the duty cycle of the heater based on a history of the temperature measured, a current value of the temperature measured, and the setpoint temperature.

The controller may be further configured to identify a fault condition based on the output flow rate determined and a commanded input flow rate of the build material and, in an event the fault condition is identified, the controller may cause an input flow of the build material to the extrusion head to halt.

The controller may be further configured to report the fault condition identified to a user interface communicatively coupled to the controller.

The controller may be further configured to determine the output flow rate based on a thermal energy balance applied to the extrusion head.

The thermal energy balance may account for heat input into the extrusion head from the heater and a net flow of heat output from the extrusion head due to extrusion of the build material transformed, forced and free convection, and conduction.

The controller may be further configured to determine the output flow rate based on an initial duty cycle employed to maintain the setpoint temperature under a zero flow condition and a gradient representing a change in duty cycle per unit of output flow rate.

The extrusion head may include a nozzle. The gradient may be based on the setpoint temperature, an ambient temperature of the extrusion head, material properties of the build material, a cross-sectional area of the nozzle or build material, and a power rating of the heater.

The material properties may include a density of the build material and specific heat of the build material.

According to another example embodiment, a method for additive manufacturing of a three-dimensional (3D) object may comprise transforming a build material, input to an extrusion head, from a first state to a second state, the first state having a higher viscosity relative to the second state, and extruding the build material transformed from the extrusion head to produce an extrudate used to print a 3D object in a 3D printing system. The method may comprise heating the extrusion head at a setpoint temperature via a heater to cause the transformation. The method may comprise maintaining the setpoint temperature of the extrusion head by controlling a duty cycle of the heater based on temperature of the extrusion head. The method may comprise determining an output flow rate of the extrudate based on the duty cycle controlled and employing the output flow rate determined to affect printing of the 3D object in the 3D printing system.

Alternative method embodiments parallel those described above in connection with the example apparatus embodiment.

According to yet another example embodiment, an apparatus for additive manufacturing of a three-dimensional (3D) object may comprise means for transforming a build material from a first state to a second state, the first state having a higher viscosity relative to the second state; means for extruding the build material transformed to produce an extrudate used to print a 3D object in a 3D printing system; and means for (i) controlling a duty cycle of the heater used for maintaining the setpoint temperature, (ii) determining an output flow rate of the extrudate based on the duty cycle controlled, and (iii) employing the output flow rate determined to affect printing of the 3D object in the 3D printing system.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a block diagram of an example internal structure of a computer optionally within an embodiment disclosed herein.

DETAILED DESCRIPTION

Figure 1:
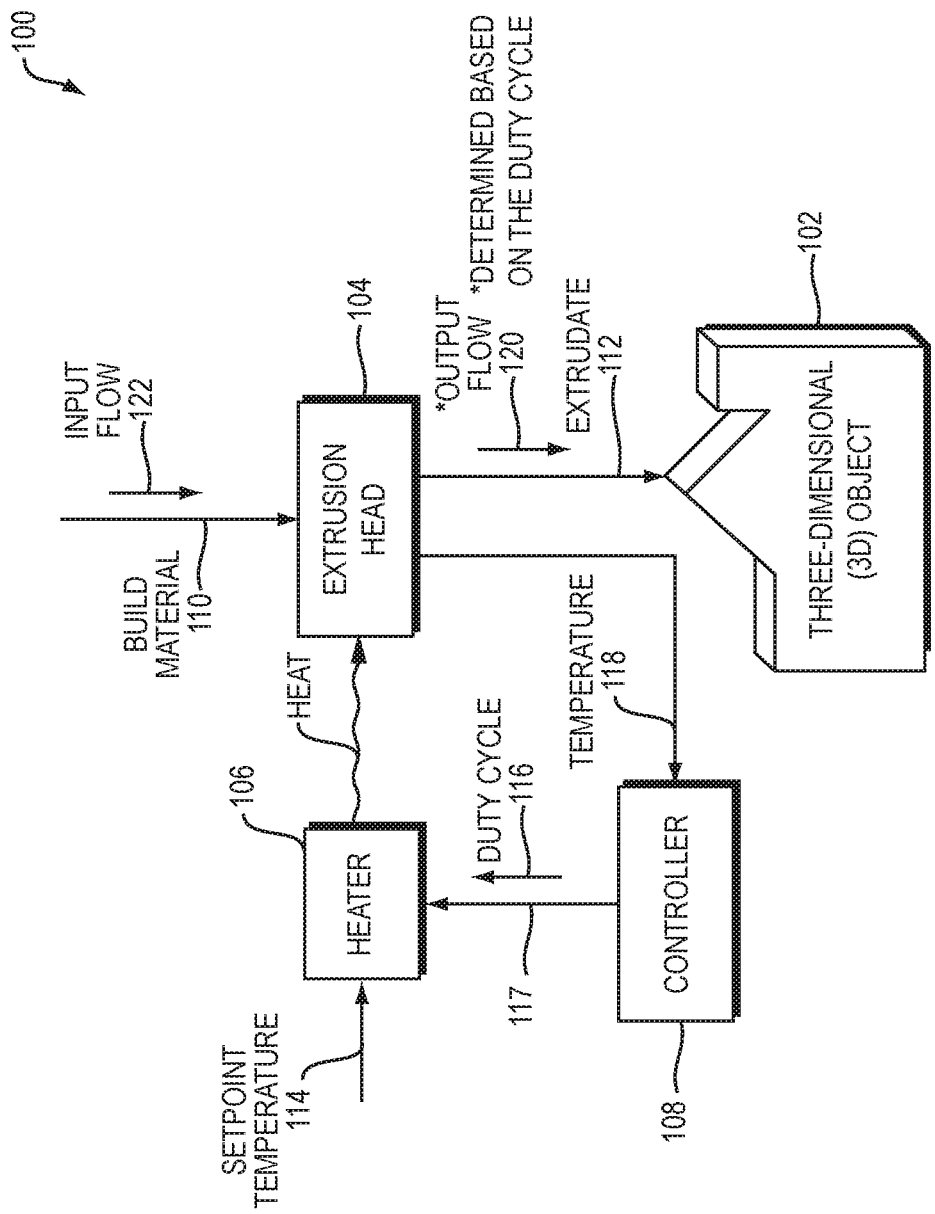
FIG. 1 is a block diagram of an example embodiment of an apparatus for additive manufacturing of a three-dimensional (3D) object.

A description of example embodiments of the invention follows.

In several additive manufacturing techniques, a solid material may be liquefied and successively deposited upon a build plate to form a solid structure. Controlling the flow to perform this deposition process is useful to ensure that the shape, strength, and surface finish of the printed part proceeds in a manner consistent with a part definition and user expectations. A major challenge in ensuring these requirements is the absence of robust and economical flow sensing technologies for complex fluids.

Build materials used in additive manufacturing are typically non-Newtonian polymer-based and melted at temperatures above 100° C. Such build materials may exhibit a viscosity of 100s to 1000s of Pa-s, and may be filled with inclusions that are either solid, liquid, or semisolid (e.g., soft). Furthermore, such inclusions can vary in size, shape, and volume fraction. Flow of such complex fluids makes the definition and characterization of flow within an extrusion assembly of a three-dimensional (3D) printing system difficult, which may be exacerbated by the nontrivial geometries of the extrusion assembly in which the build material flows.

According to an example embodiment, a mass (or volume) output flow rate of extrudate used in 3D printing may be determined, and such a determination may be insensitive to rheological properties of a build material of the extrudate being printed. A thermal energy balance on a liquefying extrusion head, such as the thermal energy balance 350 disclosed below with regard to FIG. 3, enables a load on a heater used to heat the liquefying extrusion head to be related to the output flow rate of the extrudate. The load on the heater is an amount of heat energy that needs to be added to the extrusion head to maintain a temperature of the extrusion head at a setpoint (i.e., target) temperature. As such, a duty cycle of the heater is reflective of the load. Based on the thermal energy balance, the output flow rate may be determined based on the duty cycle of the heater. The output flow rate may be employed to affect the 3D printing to prevent over- or under-extrusion of the extrudate and to identify a fault condition.

For example, while a volumetric rate of flow of material out of the extrusion head may be assumed to be equal to an inlet flow of the material to the extrusion head within a given range based on reasonable engineering estimates, such may not be the case. A malfunction of the extrusion head, such as a clogged nozzle or any other suitable malfunction, could cause the volumetric rate of flow of material out of the extrusion head to exceed the given range relative to the inlet flow. Further, a geometry or operation of the extrusion head may cause the volumetric rate of flow of material out of the extrusion head to exceed the given range relative to the inlet flow. An example embodiment may cause a change to the commanded input flow rate in response to a determination that an output rate of the extrudate exceeds the given range relative to the commanded input flow rate. Such a change may be such that over- or under-extrusion of the extrudate relative to a target amount of extrusion may be obviated and the target amount achieved. Further, the given range may include multiple ranges, such as a first given range and a second given range. The first given range may be employed to determine a change to the commanded input flow rate that continues to allow an inlet flow whereas the second given range may be used to signify that that the inlet flow be halted.

FIG. 1 is a block diagram of an apparatus 100 for additive manufacturing of a three-dimensional (3D) object 102. The apparatus 100 comprises an extrusion head 104, a heater 106, and a controller 108. The extrusion head 104, also referred to interchangeably herein as a liquefying extrusion head, may be configured to transform a build material 110 from a first state to a second state, the first state having a higher viscosity relative to the second state, and extrude the build material transformed to produce an extrudate 112 used to print the 3D object 102 in a 3D printing system (not shown). The heater 106 may be configured to heat the extrusion head 104 at a setpoint temperature 114 to cause the transformation. The controller 108 may be configured to (i) control a duty cycle 116 of the heater 106, based on temperature 118 of the extrusion head 104, to maintain the setpoint temperature 114, (ii) determine an output flow rate 120 of the extrudate 112 based on the duty cycle 116 controlled, and (iii) employ the output flow rate 120 determined, to affect printing of the 3D object 102 in the 3D printing system.

The build material 110 may be a flexible filament, or any other suitable form of build material, such as a continuous solid material (e.g., a filament on a spool), liquid material, semisolid slurry, a series of rods fed sequentially, a solid granular material, or any other suitable material that can be transformed from a first state to a second state via heat, the first state having a higher viscosity relative to the second state. A spool (not shown) may carry a coil of filament that may be mounted on a spindle (not shown).

It should be understood that in the transformation the build material 110 may not truly "melt" since it may be a mixture of metal and polymer in which the metal doesn't melt but the polymer does. The mixture may be any suitable mixture for printing the 3D object 102, such as ceramic in polymer, or any other suitable mixture. The polymer may include multiple species each with its own melting point. The setpoint temperature 114 may be such that not all polymers are in a molten state during extrusion.

The extrudate 112 may be deposited from a nozzle (not shown) of the extrusion head 104, such as the nozzle 258 of FIG. 2, disclosed further below, and the extrudate may be deposited in beads (not shown), or any in other suitable form, onto a planar base, such as the build plate 256 of FIG. 2, disclosed further below.

The controller 108 may be a closed-loop controller and the extrusion head 104 may be held at a constant temperature, that is, the setpoint temperature 114, using a closed-loop control method configured to maintain a temperature of the extrusion head 104 at the setpoint temperature 114 using a measured temperature of the extrusion head 104 as feedback for the closed-loop control. The temperature of the extrusion head 104 may be measured by a temperature sensor (not shown). The controller 108 may control the duty cycle 116 based on a difference between the setpoint temperature 114 and the measured temperature.

For example the control signal 117 may command the heater to remain "on" for a specific fraction of a time interval (a duty cycle between 0 and 100%), where the time interval is fast relative to a response time of the extrusion head 104 to thermal and flow variations. The controller 108 may be any suitable controller, such as a proportional-integral-derivative (PID) controller, or any other suitable controller configured to implement such closed-loop control. The controller 108 may employ current and recent temperature history of the extrusion head 104 as feedback and may compare such measured temperature information against the setpoint temperature 114, that is, a target temperature. A control signal 117 output by the controller may be a command to the heater 106 that commands the duty cycle 116.

As disclosed above, the apparatus 100 may further comprise a temperature sensor (not shown) configured to measure the temperature 118 of the extrusion head 104. The controller 108 may be a closed-loop controller. The controller 108 may be further configured to control the duty cycle 116 of the heater 106 based on a history (not shown) of the temperature 118 measured, a current value (not shown) of the temperature 118 measured, and the setpoint temperature 114.

According to an example embodiment, a thermal energy balance on the liquefying extruder, that is, the extrusion head 104, enables the duty cycle 116 of the heater 106 to be related to the output flow 120 of the extrudate 112 from the extrusion head 104. Since an overall temperature change in the build material 110, from its first state prior to entry to the extrusion head 104 to its second state immediately after extrusion, is known, and since the duty cycle 116 on the heater 106 needed to maintain the setpoint temperature 114 is known from the closed-loop control, disclosed above, a direct measure of heat flux from the extrusion head 104 due to the output flow 120 of the extrudate 112 may be determined, such as disclosed further below, with regard to FIG. 3. Further, a residence time of the build material 110 inside the extrusion head 104 may be of such duration that an exit temperature of the extrudate 112 is constant and uniform. An inlet temperature $T_{in}$ of the build material 110 to be printed may be known from temperature measurements of an ambient atmosphere adjacent to the build material 110 at an input to the extrusion head 104.

The controller 108 may be further configured to identify a fault condition (not shown) based on the output flow rate 120 determined and a commanded input flow rate (not shown) of the build material 110 and, in an event the fault condition is identified, the controller 108 may cause an input flow 122 of the build material 110 to the extrusion head 110 to halt. The controller 110 may be further configured to report the fault condition identified to a user interface (not shown) communicatively coupled to the controller 110. The controller 108 may cause the input flow 122 to halt by changing a commanded input flow of the input flow 122 by changing control over an actuator, such as the actuator 232 of FIG. 2, disclosed below, directly, or by changing a commanded input flow to another controller that drives (i.e., controls) the actuator.

As such, the controller 108 may affect the printing by causing a change to the commanded input flow rate based on the output flow rate 120 determined. The change may enable over-extrusion or under-extrusion of the extrudate 112 to be obviated. The change may halt the input flow 122 and, thus, halt the output flow rate 120, by changing control over an actuator, such as the actuator 232 of FIG. 2, disclosed below.

Figure 2:
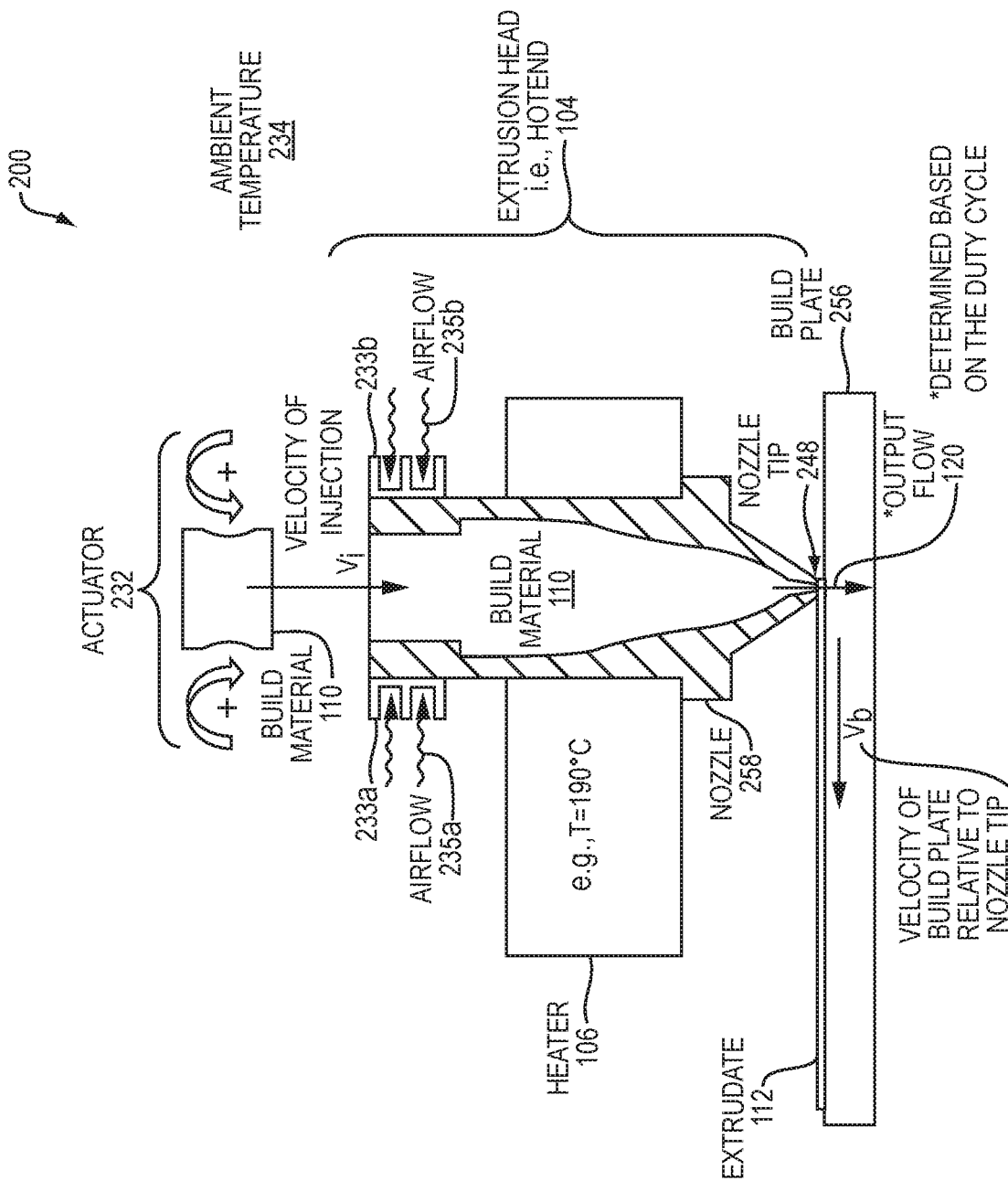
FIG. 2 is block diagram of an example embodiment of an extrusion assembly.

FIG. 2 is block diagram of an example embodiment of an extrusion assembly 200. The apparatus 100 of FIG. 1, disclosed above, may include the extrusion assembly 200. The extrusion assembly 200 includes an actuator 232 configured to advance the build material 110 to the extrusion head 104, also referred to interchangeably herein as a hotend, based on a commanded input flow rate (not shown). The extrusion head 110 is coupled to cooling fins 233a and 233b that focus air flow 235a and 235b to ensure a first state of the build material 110 entering the extrusion head 104. However, it should be understood that maintaining the build material 110 at a particular input temperature to ensure the first state of the build material 110 entering the extrusion head 110 may be performed in any suitable way.

A controller (not shown) may be configured to control the actuator 232. Such a controller may be the controller 108 of FIG. 1, disclosed above, or an additional controller that may be communicatively coupled to the controller 108. The actuator 232 may be any suitable mechanism for advancing the build material 110 into the extrusion head 104. For example, the actuator 232 may include a pair of feed rollers (not shown) driven by a motor (not shown) that advances the build material 110 into the extrusion head 104 at a controlled rate. Alternatively, the actuator 232 may include a controlling mechanism (not shown) for pushing the build material 110 along an axis of the build material 110 and down into the extrusion head 104. The actuator 232 may include a valve (not shown) that controls release of a pressure from a pressure source (not shown) that forces the build material 110 into the extrusion head 104. The actuator 232 may include a plurality of actuators (not shown). For example, a first actuator (not shown) of the plurality of actuators may perform coarse control of advancement for the build material 110, whereas a second actuator (not shown), of the plurality of actuators, may perform fine and fast control relative to control performed by the first actuator.

The extrusion head 104 may be pressurized by "pumping" the build material 110 into the extrusion head 104 by the actuator 232. The build material 110 may act as a piston. The pressurization may impel a molten form of the build material 110 out of the nozzle 258 via the nozzle tip 248. The output flow 120 of the build material 110 may be controlled by adjusting the actuator 232. For example, the controller may be configured to adjust a speed of rotation of the pair of feed rollers (not shown) or to adjust the actuator 232 in any other suitable way. The controller may be configured to control the output flow 120 of the build material 110 by driving control signal(s) (not shown) to the actuator 232. For example, the controller may drive the control signal(s) that may control a motor (not shown) configured to drive a feed roller (not shown) of the actuator 232, or may drive any other suitable control signal that causes the actuator 232 to control movement of the build material 110.

The output flow rate 120 may be a velocity $V_e$ of the extrudate 112 of the build material 110 following exit from the nozzle tip 248 of the nozzle 258 of the extrusion head 104. A velocity of the build plate 256 (also referred to interchangeably herein as a bed or stage) that may be a planar surface, is represented by $V_b$ 254, where $V_b$ 254 represents the velocity of the build plate 256 relate to the nozzle tip 248 of the nozzle 258. According to an example embodiment, the output flow rate 120 may be determined based on a thermal energy balance applied to the extrusion head 104, such as the thermal energy balance 350 of FIG. 3, disclosed below.

Figure 3:
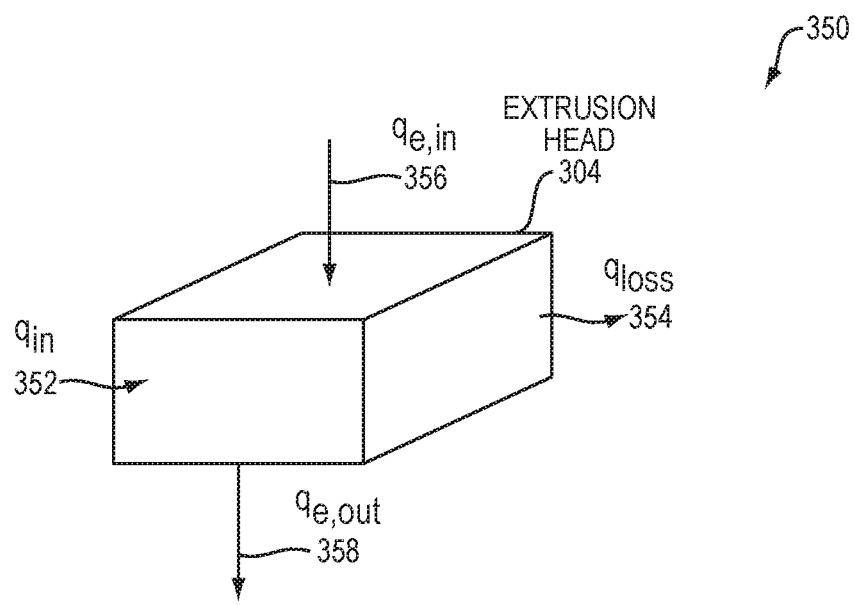
FIG. 3 is a block diagram of an example embodiment of a thermal energy balance.

FIG. 3 is a block diagram of an example embodiment of a thermal energy balance 350. The thermal energy balance 350 accounts for heat input into the extrusion head 304 from the heater, such as the heater 106, disclosed above with regard to FIG. 1 and FIG. 2, and a net flow of heat output from the extrusion head 304. The net flow of heat output from the extrusion head 304 includes heat losses to the surrounding environment of the extrusion head 304 and may include heat losses due to extrusion of the build material transformed, forced and free convection, and conduction.

In the thermal energy balance 350, $q_{in}$ 352=P*dutyCycle, that is, energy per unit time used to heat the extrusion head 304 to the setpoint temperature 114, where P is a heater power rating of the heater 106 in Watts, and dutyCycle is the duty cycle 116 controlled by the controller 108.

In the thermal energy balance 350, $q_{Loss}$ 354=C, the energy per unit time lost to the surroundings of the extrusion head 304, where C is a loss of heat to the surroundings in Watts, which depends on the setpoint temperature 114 and the ambient temperature 234, but is otherwise unaffected by the flow of the build material 110.

Further, in the thermal energy balance 350, $q_{e,in}$ 356=$\rho*C_p*T_{in}*Q_{in}$, the heat added to the hotend by the injection of the cold feedstock, where $\rho$ is the density of the build material 110 (mass per volume), $C_p$ is the heat capacity of the build material 110 (energy per mass per degree Centigrade or Kelvin), $T_{in}$ is the temperature of the build material 110 as it enters the control volume around the hotend, which is the ambient temperature 234, and $Q_{in}$ is the volumetric rate of flow of the material into the hotend, that is, the extrusion head 304.

In the thermal energy balance 350, $q_{e,out}$ 358=$\rho*C_p*T_{ext}*Q_{out}$, the heat lost from the hotend upon extrusion of the heated extrudate. Here, $\rho$ is the density of the extrudate, $C_p$ is the specific heat of the extrudate 112, $T_{ext}$ is the temperature of the extrudate (which is also the setpoint temperature 114 of the hotend), and $Q_{out}$ is the volumetric rate of flow of the material out of the extrusion head 304. This flow $Q_{out}$ may be assumed to equal to the inlet flow $Q_{in}$ to within reasonable engineering estimates, as disclosed above.

The thermal energy balance 350 does not depend upon the rheological properties of the material. Rather, the only material-specific properties relied upon may be the density and the volumetric heat capacity of the build material 110 being printed, both of which may be readily characterized for each type of build material 110 and is a quick measurement. The thermal energy balance 350 yields an expression relating the duty cycle 116 of the heater 106 to the output flow rate 120, that is, a rate of flow, feedstock velocity, or extrudate velocity through the hotend, the is, the extrusion head 304, as disclosed below with regard to FIG. 4.

Figure 4:
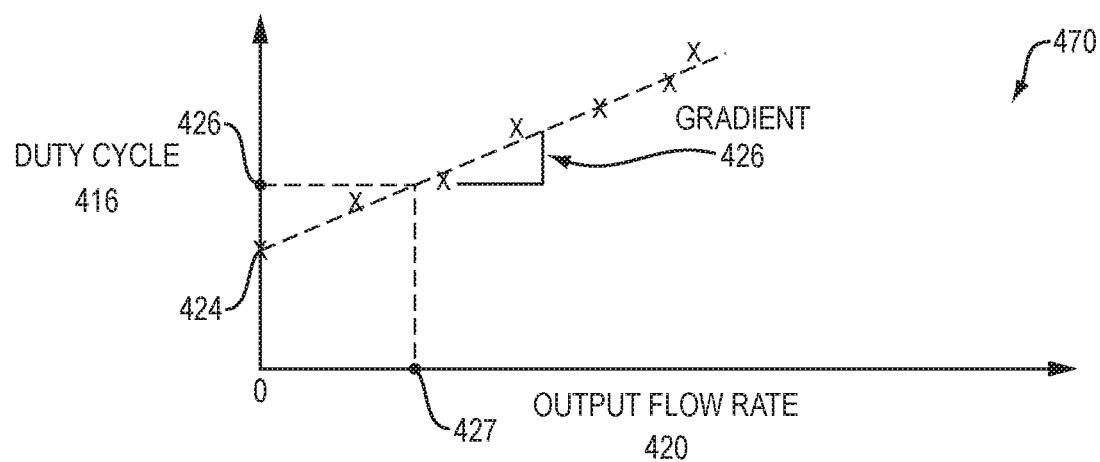
FIG. 4 is a graph of an example embodiment of a plot of duty cycle versus output flow rate.

FIG. 4 is a graph of an example embodiment of a plot 470 of duty cycle 416 versus output flow rate 420. The intercept 424 on the y-axis is given by the loss of heat to the surroundings, that is, $q_{Loss}$ 354 of FIG. 3, disclosed above, which can easily be characterized by measuring the load on the heater 106 under zero flow conditions.

The gradient 426, that is, the slope, can be determined with knowledge of material properties of the build material 110, a geometry of the build material 100 and/or nozzle, the ambient and hotend setpoint temperatures, that is, the ambient temperature 234 and the setpoint temperature 114 of FIG. 2 and FIG. 1, respectively, and the power rating P of the heater 106.

Based on the thermal energy balance 350, disclosed above, the gradient 426 may be computed as M=$(\rho*C_p*A_x)(T_{ext}-T_{in})/P$, where $A_x$ may be a cross-sectional area of the nozzle, such as the nozzle 258, disclosed above with regard to FIG. 2, or the build material 110, $T_{in}$ may be the ambient temperature 234 surrounding the build material 110 outside of the extrusion head 104, and Text may be the temperature of the extrudate, that is, the setpoint temperature 114 within reasonable engineering estimates. As such, the plot 470 that may be characterized for a particular type of extrusion head 104 and particular type of build material 110 yields an expression that may be used by the controller 108 to determine a particular output flow rate 427 based on a value 426 of the duty cycle 416.

As such, the controller 108 may be further configured to determine the output flow rate 420 based on (i) the initial duty cycle, that is, the intercept 424 of FIG. 4, disclosed above, that may be employed to maintain the setpoint temperature 114 under a zero flow condition, and (ii) the gradient 426 that represents a change in duty cycle 416 per unit of output flow rate 420, as disclosed above with regard to FIG. 4. As disclosed above, the gradient 426 may be based on the setpoint temperature 114 that may be used as $T_{ext}$, an ambient temperature 232 of the extrusion head 104, that may be employed as $T_{in}$, material properties of the build material 104, a cross-sectional area $A_x$ of the nozzle 258 or build material 110, and a power rating P of the heater. As disclosed above, the material properties may include a density $\rho0$ of the build material and specific heat $C_p$ of the build material.

Figure 5:
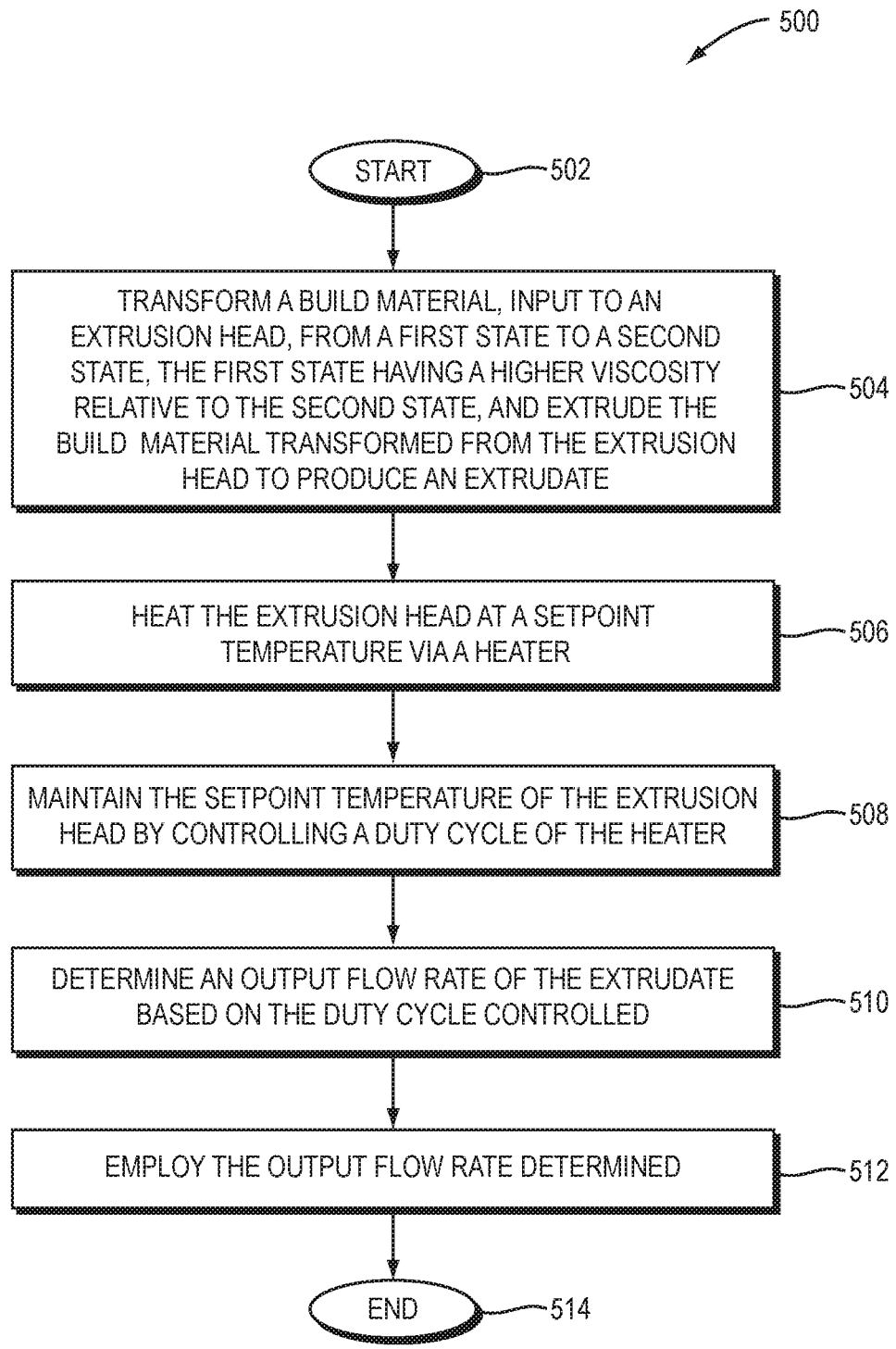
FIG. 5 is a flow diagram of an example embodiment of a method for additive manufacturing of a 3D object.

FIG. 5 is a flow diagram of an example embodiment of a method for additive manufacturing of a three-dimensional (3D) object (500). The method begins (502) and transforms a build material, input to an extrusion head, from a first state to a second state, the first state having a higher viscosity relative to the second state, and extrudes the build material transformed from the extrusion head to produce an extrudate used to print a 3D object in a 3D printing system (504). The method heats the extrusion head at a setpoint temperature via a heater to cause the transformation (506). The method maintains the setpoint temperature of the extrusion head by controlling a duty cycle of the heater based on temperature of the extrusion head (508). The method determines an output flow rate of the extrudate based on the duty cycle controlled (510). The method employs the output flow rate determined to affect printing of the 3D object in the 3D printing system (512) and the method thereafter ends (514), in the example embodiment.

FIG. 6 is a block diagram of an example of the internal structure of a computer 600 in which various embodiments of the present disclosure may be implemented. The computer 600 contains a system bus 602, where a bus is a set of hardware lines used for data transfer among the components of a computer or processing system. The system bus 602 is essentially a shared conduit that connects different elements of a computer system (e.g., processor, disk storage, memory, input/output ports, network ports, etc.) that enables the transfer of information between the elements. Coupled to the system bus 602 is an I/O device interface 604 for connecting various input and output devices (e.g., keyboard, mouse, displays, printers, speakers, etc.) to the computer 600. A network interface 606 allows the computer 600 to connect to various other devices attached to a network. Memory 608 provides volatile or non-volatile storage for computer software instructions 610 and data 612 that may be used to implement embodiments of the present disclosure, where the volatile and non-volatile memories are examples of non-transitory media. Disk storage 614 provides non-volatile storage for computer software instructions 610 and data 612 that may be used to implement embodiments of the present disclosure. A central processor unit 618 is also coupled to the system bus 602 and provides for the execution of computer instructions, such as computer instructions that may drive the controller 108 of FIG. 1, disclosed above.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for additive manufacturing, the method comprising:
instructing a heating element of a 3D printing system to maintain a setpoint temperature of an extrusion head of the 3D printing system;
receiving information pertaining to a duty cycle of the heating element; and
based on the received information, determining an output flow rate of an extrudate output by the extrusion head according to a known duty cycle of the heating element for no extrudate output and a known rate of increase in extrude output as a function of the duty cycle of the heating element.

2. The method of claim 1, wherein the determining step is also based on at least one of a density or a heat capacity of a build material fed into the extrusion head.

3. The method of claim 1, wherein the determining step is also based on at least one of a temperature of the extrudate or a temperature of a build material before the build material is fed into the extrusion head.

4. The method of claim 1, the method further comprising: based on the determined output rate, communicating an instruction to the 3D printing system to change an input flow rate of a build material into the extrusion head to a modified input flow rate.

5. The method of claim 4, the method further comprising: prior to communicating the instruction to the 3D printing system, comparing the determined output rate to an original input flow rate of the build material into the extruder.

6. The method of claim 4, the method further comprising: based on the comparison, determining if the extrudate is being either over- or under-extruded.

7. The method of claim 1, wherein the determining step is also based on a loss of heat by the extruder to a surrounding environment.

* * * * *